(12) United States Patent
Lemmen et al.

(10) Patent No.: US 11,582,921 B2
(45) Date of Patent: Feb. 21, 2023

(54) SYSTEM FOR GROWING MUSHROOMS

(71) Applicants: Jacobus Alexander Jozef Lemmen, Venlo (NL); Marcus Gerardus Maria Van Doremaele, Velddriel (NL)

(72) Inventors: Jacobus Alexander Jozef Lemmen, Venlo (NL); Marcus Gerardus Maria Van Doremaele, Velddriel (NL)

(*) Notice: Subject to any disclaimer, the term of this patent is extended or adjusted under 35 U.S.C. 154(b) by 526 days.

(21) Appl. No.: 16/726,847

(22) Filed: Dec. 25, 2019

(65) Prior Publication Data

US 2020/0205355 A1 Jul. 2, 2020

(30) Foreign Application Priority Data

Dec. 27, 2018 (NL) .................................. 2022318
May 20, 2019 (NL) .................................. 2023167
Dec. 4, 2019 (NL) .................................. 2024381

(51) Int. Cl.
*A01G 18/70* (2018.01)
*A01G 18/62* (2018.01)
*A01G 18/69* (2018.01)

(52) U.S. Cl.
CPC ............. *A01G 18/70* (2018.02); *A01G 18/62* (2018.02); *A01G 18/69* (2018.02)

(58) Field of Classification Search
CPC ......... A01G 18/62; A01G 18/69; A01G 18/70
See application file for complete search history.

(56) References Cited

U.S. PATENT DOCUMENTS 2,353,638 A * 7/1944 Beaulieu ................ B65G 47/00
                                                  198/351
4,736,574 A * 4/1988 Walker ................. A01D 46/243
                                                   56/328.1
(Continued)

FOREIGN PATENT DOCUMENTS

CN      107647455      2/2018
CN      107736637      2/2018
(Continued)

OTHER PUBLICATIONS

Onderzoeksrapport Betreffende het Resultaat van het Onderzoek Naar Stand van de Techniek het Internationale Type [International Search Report] and the Written Opinion dated Jan. 24, 2020 From the European Patent Office Re. Application No. NL2023167. (10 Pages).
(Continued)

*Primary Examiner* — Monica L Perry
*Assistant Examiner* — Aaron M Rodziwicz

(57) ABSTRACT

The present invention relates to a system for growing mushrooms, comprising a shelving, comprising multiple support beds for holding compost and casing soil arranged above each other, a picking platform for harvesters, the platform movable with at least a vertical directional component along the shelving and a harvesting conveyor, comprising a harvesting conveyor belt that extends at least partially along the beds and is supported by a number of guides, along which the harvesting conveyor is movable, wherein at least one of the guides is coupled to the shelving; and at least one of the guides is coupled to the picking platform and is movable together with the platform with at least a vertical directional component.

19 Claims, 3 Drawing Sheets

(56) References Cited

U.S. PATENT DOCUMENTS

| | | | | |
|---|---|---|---|---|
| 4,899,527 | A * | 2/1990 | van den Munckhof | A01D 46/243 414/508 |
| 4,909,697 | A * | 3/1990 | Bernard, II | B65G 1/0485 198/463.3 |
| 5,101,593 | A * | 4/1992 | Bhatt | A01G 9/243 47/61 |
| 5,222,855 | A * | 6/1993 | Bernard, II | B65G 1/1371 221/9 |
| 5,246,332 | A * | 9/1993 | Bernard, II | B65G 1/0485 414/807 |
| 5,273,392 | A * | 12/1993 | Bernard, II | B65G 1/0485 198/346.2 |
| 5,438,794 | A * | 8/1995 | Wi | A01G 9/143 47/17 |
| 5,472,309 | A * | 12/1995 | Bernard, II | B65G 1/0485 414/807 |
| 6,481,190 | B2 * | 11/2002 | Van Zanten | A01G 9/143 47/17 |
| 9,227,786 | B2 * | 1/2016 | Kozasa | B65G 17/20 |

FOREIGN PATENT DOCUMENTS

| | | | |
|---|---|---|---|
| CN | 112400602 A * | 2/2021 | |
| EP | 0292075 A1 * | 5/1988 | |
| EP | 0292075 | 11/1988 | |
| EP | 1810563 | 7/2007 | |
| EP | 1810563 A1 * | 7/2007 | .......... A01D 45/005 |
| EP | 3387896 | 10/2018 | |
| EP | 3387896 A2 * | 10/2018 | ............ A01G 18/00 |
| GB | 2298597 | 9/1996 | |
| NL | 1000270 | 2/1996 | |
| WO | WO 03/092354 | 11/2003 | |
| WO | WO-03092354 A1 * | 11/2003 | .......... A01D 45/005 |

OTHER PUBLICATIONS

Onderzoeksrapport Betreffende het Resultaat van het Onderzoek Naar Stand van de Techniek het Internationale Type [International Search Report] and the Written Opinion dated Aug. 30, 2019 From the European Patent Office Re. Application No. NL2022318. (10 Pages).

* cited by examiner

SYSTEM FOR GROWING MUSHROOMS

RELATED APPLICATIONS

This application claims the benefit of priority of Netherlands Patent Applications Nos. 2022318 filed on Dec. 27, 2018, 2023167 filed on May 20, 2019, and 2024381 filed Dec. 4, 2019, the contents of which are incorporated herein by reference in their entirety.

FIELD AND BACKGROUND OF THE INVENTION

The present invention relates to a system for growing mushrooms. At industrial scales, mushrooms are traditionally grown at indoor locations, often called growing rooms, wherein shelvings are placed that support beds for holding compost and casing soil, on which the mushrooms are grown.

The compost and casing soil are placed on pulling nets, that allow to fill and empty the bed with compost and casing soil easily. Usually, this is done after every two or three flushes of mushrooms, since the compost has lost its fertility and nutrition then.

The beds are placed at a mutual distance above each other in the shelving, and harvest of the mushrooms takes place manually by harvesters, standing next to the beds at various height levels and delivering the mushrooms to harvesting conveyors once they are cut. From there on they are further processed, either manually or in an automated way.

The beds have an average length of 10 to 100 meters, a width of 0.5 to 2 meters, and are usually placed 0.4 to 1.4 meters above each other. As a result, the harvesters cannot reach all mushrooms without stooping. Given the required speed of working and the total length of the beds, this makes harvesting a cumbersome job, with even certain health risks. Moreover, harvesters tend to stand straight to avoid a painful back, but in this position they only have sight to a part of the bed, with the result that part of the harvesting takes place on intuition, which may have a negative impact on the quality of the work, since a better selection can be made when an eye is kept on the work.

The harvesting conveyors are usually arranged in a frame, that can be lifted to approximately the height of the bed that is to be harvested, so that the harvested mushrooms can be easily transferred. This lifting can be done manually or be powered, but it remains a cumbersome task, which is worsened by the weight of the frames, that, additionally form a heavy load on the shelvings.

SUMMARY OF THE INVENTION

It is a goal of the present invention to provide a device for growing mushrooms that takes away the disadvantages of the prior art, and in particular the disadvantages regarding the harvesting conveyors.

The invention therefore provides a system for growing mushrooms, comprising a shelving, comprising multiple support beds for holding compost and casing soil arranged above each other a picking platform for harvesters, the platform movable with at least a vertical directional component along the shelving a harvesting conveyor, comprising a harvesting conveyor belt, in particular an endless belt comprising holes for receiving stipes of mushrooms, that extends at least partially along the beds and is supported by a number of guides, along which the harvesting conveyor is movable wherein at least one of the guides is coupled to the shelving and at least one of the guides is coupled to the picking platform and is movable together with the platform with at least a vertical directional component.

The system according to the invention provides several benefits. Firstly, the harvesting conveyor is automatically aligned with the harvesting platform in the vertical direction, since the height adjustment of the picking platform, which may be part of the lorry, is integrated and takes place simultaneously. This saves harvesters effort and time and leads to a more efficient harvesting of the mushrooms, and it leads to a simpler and lighter construction of the entire system. The picking platform may also comprise a balustrade to prevent harvesters from falling off the platform.

In a further embodiment the harvesting conveyor belt is guided by at least two guides coupled to the picking platform, wherein the guides are in particular each spaced from the platform in a vertical direction between 75 cm and 125 cm, and in particular between 85 cm and 115 cm, more in particular each at the same distance from the platform as to form a parallel stretch to the picking platform at a picking height. The parallel stretch of the harvesting conveyors makes it easier for the harvester to deposit the mushrooms into the harvesting conveyor.

The guides may comprise rollers, wherein the guides comprise rollers and/or static guiders, wherein said static guiders guide the harvesting conveyor at its sides, leaving space for stipes to pass through unobstructed. The rollers and/or static guiders ensure a stable transport of the harvesting conveyor, therewith decreasing the risk of mushrooms falling off the harvesting conveyor. Also, the rollers and/or static guides allow for easy passage of the mushrooms, without breaking them.

In an alternative embodiment the harvesting conveyor is looped along at least a back and forward stretch that extend beyond the length of the bed, wherein the part beyond the bed comprises a lower running section, wherein at least one, but preferably both the forward and the backward stretch are at a distance of less than 50 cm, preferably less than 40 cm and more preferably less than 30 cm from a ground level, for providing an easy step passage. The easy step passage allows for a safe exit in case of emergency. As an alternative non limitative example the forward or backward stretch may also be placed at a distance of more than 250 cm, preferable more than 260 and more preferably more than 270 cm from ground level. This creates a step passage between the two stretches of the harvesting conveyor.

In a practical embodiment the picking platform forms part of a picking lorry, wherein the picking platform horizontally extends below the harvesting conveyor, such that a projection of the harvesting conveyor on a plane wherein the picking platform extends, at least partly overlaps the picking platform. Picking lorries are commonly used for mushroom harvesting and are movable along the shelvings. Extending the picking platform below the harvesting conveyor yields a more upright picking position for the harvester. The lorry may have lifting equipment for lifting the platform, which may be automated and/or powered, and be controllable by the harvester. The same goes for a horizontal movement of the lorry, which may also be powered and controllable by the harvester, so that there is no need to leave the platform or the lorry while harvesting.

A different embodiment of the device may be such that the picking lorry comprises a frame that is movably attached to the shelving and wherein the picking platform is detachable from the frame or the shelving. The detachable picking platform is necessary in order for the harvester to reach the lowest bed. Since the picking platform extends horizontally below the harvesting conveyor, it cannot lower more than the returning stretch of the harvesting conveyor. Thus, by detaching the picking platform, the lowest bed is in reach of the harvester.

In yet another embodiment a moistening system is coupled to the picking platform, the moistening system comprising nozzles for spreading moisture over at least one support bed. This feature enables the lorry to automatically and evenly distribute moisture over the mushrooms. The moistening system is not limited to distributing moisture but can, in an alternative form, also distribute fertilizer as a non-limitative example. The coupling of the moistening system may be directly to the picking platform, but may also be indirectly, such as to the frame of the picking lorry. It takes away the need for a separate moisturing system.

It might be the case that the harvesting conveyor stretches slightly over time. In order to compensate for such effect the harvesting conveyor is provided with a tensioner, located on the lorry or picking platform or at a distal location and comprising a movable guide or roller, that moves in order to compensate for the change in the total length of the trajectory of the harvesting conveyor when the picking platform is moved. The roller provides an easy method for providing adjustable tension to the harvesting conveyor.

For easy and modular operation of the tensioner, the tensioner comprises a plurality of independently removable weights. The weights may be attached by hooks, magnets, or any other suitable attachment means known in the art. The rollers may be provided with solutions for keeping the belt on track may be applied.

In a different embodiment of the device the picking platform is carried by a frame of a picking lorry, the frame comprising an arm that extends from the frame with a horizontal directional component, and wherein the arm supports a remote guide at a height level at or below the height of the lowest bed for the harvesting conveyor at a horizontal distance remote from the picking platform, such that a height of the harvesting conveyor decreases in the direction from said first guide attached to the picking platform to said remote guide supported by the arm. This additional guide, supported on said arm, results in a slowly decaying harvesting conveyor.

Preferably the harvesting conveyor belt is an endless conveyor belt. This allows to operate the conveyor continuously and also allows to position the driven guide or roller at any place along the trajectory the belt follows. This can for instance be a distal location where harvesters cannot come in contact with the drive or its power cables.

In a preferred embodiment, the conveyor is frameless. That is, the harvesting conveyor is supported locally by the guides, but is hanging freely in between, without support or a frame, and in particular without a sliding contact with any further parts. This makes the entire construction simpler, lighter, and easier to maintain. Moreover, without a sliding contact, there is less friction and it costs less energy to drive the belt, which makes it possible to work with smaller or lighter drives.

The picking platform to which at least one of the guides is coupled may in a practical embodiment form part of a picking lorry. In order to enable the harvesters to remain on the lorry and/or platform, the harvesting conveyor preferably extends over the entire length of the conveyor. At the end of the conveyor, mushrooms may be taken from the conveyor or the conveyor may drop them for further processing.

The at least one guide that is coupled to the picking platform may be movable together with the platform with a horizontal directional too.

When the picking platform moves with a vertical or horizontal directional component, the total length of the trajectory the harvesting conveyor has to take may change. For that reason, the length of the belt may be over dimensioned, and the harvesting conveyor may be provided with a tensioner.

Further embodiment, the harvesting conveyor belt returns at least partly below the shelving. This is a safe location where no harvesters need to be, so that the risk of unintended contact of picking lorries or harvesters with the conveyor belt is minimized In a further embodiment the arm is adjustable, in particular longitudinally compressible by a stopper, said stopper located near the end of the beds. Upon moving the picking platform and/or lorry in a direction along the shelvings beyond a predetermined location, the stopper restricts further movement of said arm in said direction, preferably the restriction is implemented by stopping a guide attached on said arm. The length of said arm may be adjusted by any means of reducing the length of an arm known in the art. The length of said arm is defined by a horizontal distance, measured from the picking platform and/or lorry towards the guide attached to said arm. Such an implementation can reduce the necessary area of the system, thereby increasing the productive area and reducing useless space.

In another further embodiment the harvesting conveyor is at an angle, wherein said section formed by said first guide and said second guide, wherein the angle is maintained below a maximum value of 45 degrees with the horizontal axis, but preferably below 40 degrees with the horizontal axis, wherein the measure of compression of the arm defines the angle. This angle is optimized such that the compressible arm does not extend excessively beyond the beds and the angle is sufficiently small to keep the mushrooms on the belt.

In another different embodiment a sweeper is attached to the picking platform and/or lorry, wherein said sweeper is adjacent to the picking platform and/or lorry, and extending in the direction of the bed, said sweeper covering the distance between the bed and the harvesting conveyor. Said sweeper saves mushrooms from falling to the ground. This reduces the amount of spoiled harvest.

In a further embodiment a catch tray is attached along the length of the picking platform and/or lorry at a side facing the beds, constructed of a compressible material, configured to intercept tumbling mushrooms. Said catch tray further decreases the amount of spoiled harvest. This is due to the fact that mushrooms falling of the harvester side of the harvesting conveyor are also saved from falling to the ground.

In a yet further embodiment said catch tray forms a guide for the harvesting conveyor as it runs along the picking platform and/or lorry. Thereby the complexity of the system is reduced.

In a different embodiment the shelvings are arranged in a cell, wherein the cell comprises a door, comprising a cut-out through which the harvesting conveyor extends. This door comprising a cut-out reduces the volume which is to be maintained at specific mushroom growing conditions. The smaller volume reduces the energy required for the system and therewith decreasing polluting emissions.

In yet another embodiment of the present invention the harvesting conveyor belt comprises at least one aperture for receiving a mushroom stipe, wherein said aperture comprises in the length direction of the harvesting conveyor belt at least a part wherein its width decreases. Wherein, in a further embodiment said aperture is triangular and/or diamond shaped, in particular a rounded triangular and/or diamond shape. The aperture is configured such that the harvester can easily place a mushroom stipe in said aperture. The aperture is also shaped such that, on the section of the harvesting conveyor at an angle, the mushrooms do not fall out of the harvesting conveyor.

Multiple embodiments of a conveyor belt that is applicable in the present invention are described in the Dutch patent application 2023167 by the same applicant, which is herein incorporated by reference.

a further embodiment, the system according to the invention is provided with a harvesting conveyer fixed at the height level of the lowest support bed. This harvesting conveyor may be a separate second conveyor, but it may also be a loop of the first conveyor. This harvesting conveyer at a fixed height level allows harvesters to pick mushrooms from said lowest level independent from the position and height of the picking platform.

In order to move the conveyor belt, the system according to the invention may comprise a drive, which may comprise at least one guide that drives the conveyor. This driven guide may as well be positioned below the shelving.

The drive may be configured to adapt the speed of the harvesting conveyor to a horizontal speed of the picking platform. In particular, the drive may be configured to keep the relative speed of the harvesting conveyor with respect to the picking platform constant, to facilitate the harvesters. That means that the speed of the harvesting conveyor is increased when the picking platform/lorry moves along with it, and is decreased when the picking platform/lorry moves in opposite direction.

BRIEF DESCRIPTION OF THE SEVERAL VIEWS OF THE DRAWINGS

The invention will now be elucidated into more detail with reference to the following figures, wherein like referential numerals indicate like parts and.

DESCRIPTION OF SPECIFIC EMBODIMENTS OF THE INVENTION

Figure 1:
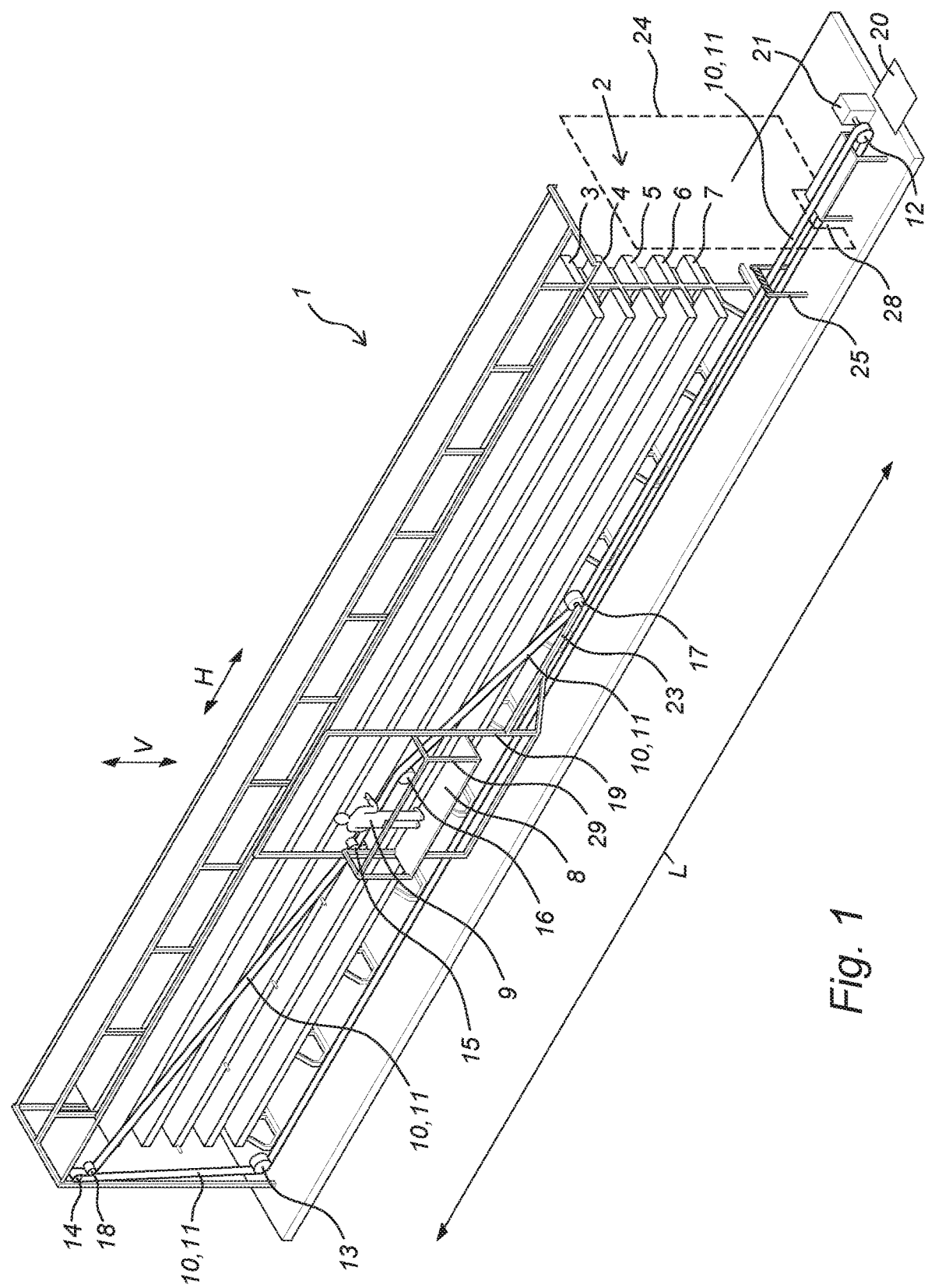
FIG. 1 shows a perspective view on a first embodiment of a system according to the invention.

FIG. 1 shows a system 1 for growing mushrooms, comprising a shelving 2, comprising multiple support beds 3, 4, 5, 6, 7 for holding compost and casing soil arranged above each other, a picking platform 8 for harvesters 9. The platform 8 is movable with at least a vertical directional component V along the shelving. The picking platform may also comprise a balustrade 29 to prevent harvester 9 from falling off the picking platform 8. The system further comprises a harvesting conveyor 10, comprising a harvesting conveyor belt 11 that extends at least partially along the beds 3, 4, 5, 6, 7 and is supported by a number of guides 12, 13, 14, 15, 16, 17 along which the harvesting conveyor belt 11 is movable. Guides 12, 13, and 14 are coupled to the shelving and at guides 15, 16 and 17 are coupled to the picking platform 8 and are movable together with the platform 8 with at least a vertical directional component V.

The guides 12, 13, 14, 15, 16, 17 comprise rollers, wherein the harvesting conveyor belt 11 is looped around the rollers 12, 13, 14, 15, 16, 17. The harvesting conveyor 10 is an endless conveyor, and the belt 11 is looped around the guides. The harvesting conveyor 10 is provided with a tensioner 18, which is formed by a movable guide or roller, that can move in order to compensate for the change in the total length of the trajectory of the conveyor belt when the picking platform 8 is moved, either in horizontal H or vertical direction V. In order to move the picking platform 8, it may form part of a picking lorry 19. The picking lorry 19 comprises a frame 19 comprising an arm 23 that extends from the frame 19 with a horizontal directional component, and wherein the arm supports a remote guide 17 at a height level at or below the height of the lowest bed 7 for the harvesting conveyor at a horizontal distance remote from the picking platform 8, such that a height of the harvesting conveyor 10, 11 decreases in the direction from said first guide 16 attached to the picking platform to said remote guide 17 supported by the arm 23. The length of the arm 23 is adjustable, in particular longitudinally compressible by a stopper 25, said stopper 25 located near the end of the beds 3, 4, 5, 6, 7. In this specific embodiment the shelvings are arranged in a cell, wherein the cell comprises a door 24, comprising a cut-out 28 through which the harvesting conveyor 10 extends.

In the depicted embodiment, the harvesting conveyor 10 is frameless, that is, its belt 11 is supported by the guides, but extends without a cover or frame in between them over at least part of its total length. The harvesting conveyor may preferably extend at least over the entire length L of the shelving. The harvesting conveyor 10 is configured to deliver mushrooms to a delivery point 20 from where they can be processed further. The harvesting conveyor may return at least partly below the shelving (not depicted). It may further comprising a drive 21 for driving the conveyor 10.

Figure 2:
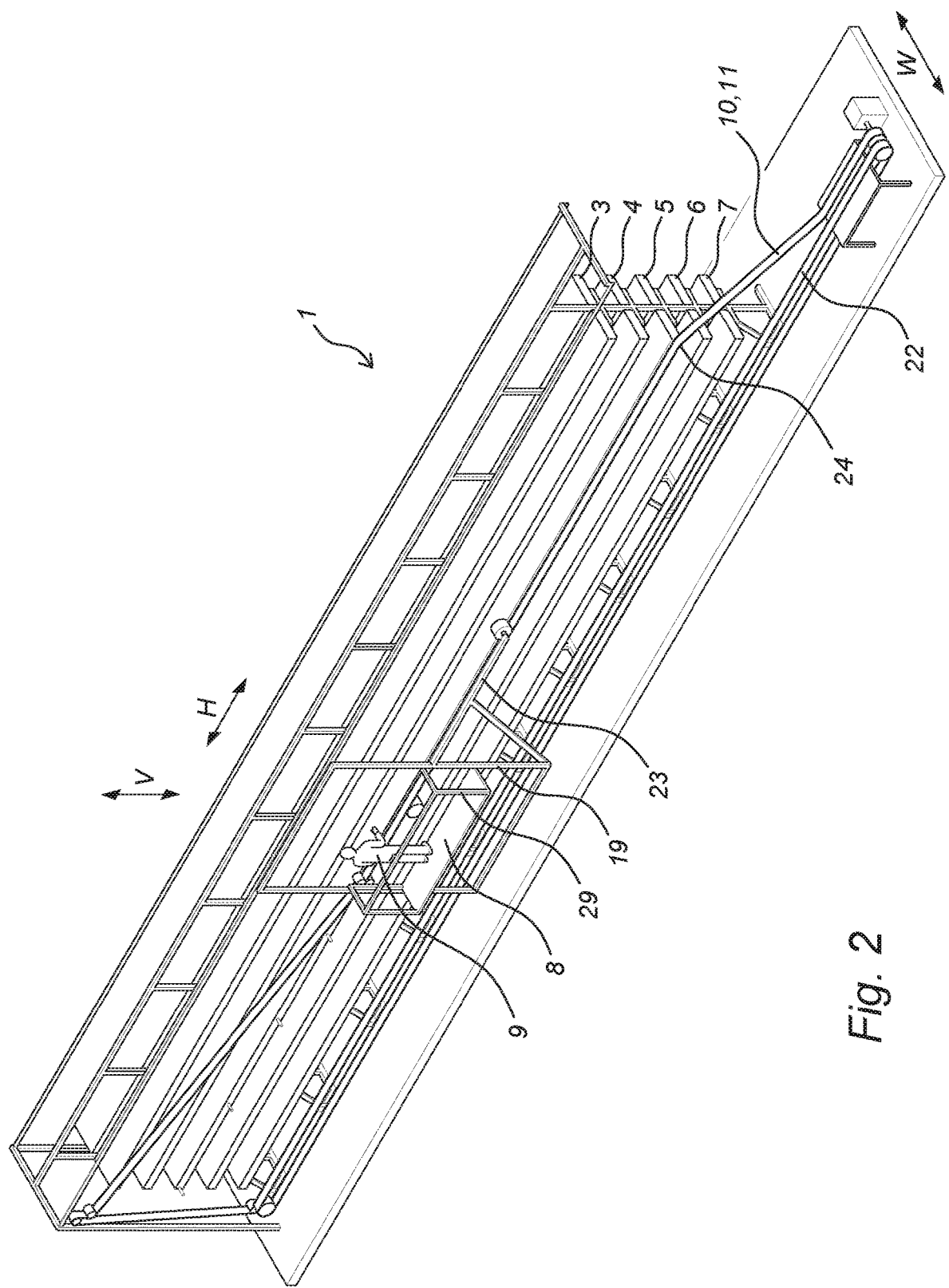
FIG. 2 shows a perspective view on a second embodiment of a system according to the invention.

FIG. 2 shows a second embodiment of a system according to the invention. The system is provided with a second harvesting conveyor 22, placed besides the first harvesting conveyor 10, 11 in a width direction. The second conveyor is at a fixed height, allowing harvesters to pick mushrooms from the lowest supports 6 and 6, while standing on ground level. The picking lorry has such construction 23 that the first harvesting conveyor 10, 11 remains above the second harvesting conveyor 22, and for that purpose an additional guide 24 is provided.

Figure 3:
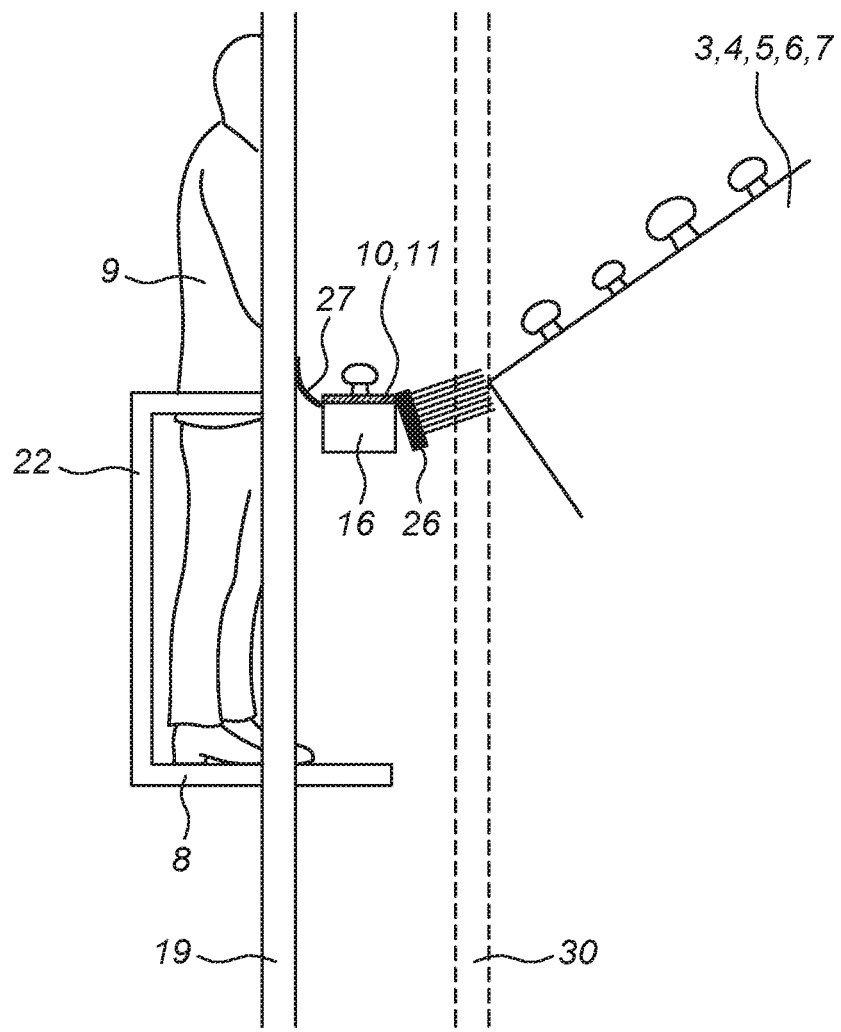
FIG. 3 shows a schematic side view of a first embodiment of a system according to the invention

FIG. 3 shows a schematic side view of a harvester 9 on a picking platform 8. In this embodiment of the invention a sweeper 26 is attached to the picking platform 8 and/or lorry 19, wherein said sweeper 26 is adjacent to the picking platform 8 and/or lorry 19, and extending in the direction of the bed 3, 4, 5, 6, 7, said sweeper 26 covering the distance between the bed 3, 4, 5, 6, 7 and the harvesting conveyor 10,11. The sweeper 26 is configured to enclose any object in the space between the bed 3, 4, 5, 6, 7 and the harvesting conveyor 10, 11. Such an object may in a non-limitative example be a pillar 30, forming a part of the shelvings. Furthermore, a catch tray 27 is attached along the length of the picking platform 8 and/or lorry 19 at a side facing the beds 3, 4, 5, 6, 7, constructed of a compressible material, configured to intercept tumbling mushrooms. Said catch tray 27 further decreases the amount of spoiled harvest.

The embodiments shown are examples only and limit in no sense the scope of protection as defined in the following claims.

What is claimed is:

1. A system for growing mushrooms, comprising:
a shelving, comprising:
multiple support beds for holding compost and casing soil arranged above each other;
a picking platform for harvesters, the platform movable with at least a vertical directional component along the shelving;
a harvesting conveyor, comprising:
a harvesting conveyor belt, being an endless belt comprising holes for receiving stipes of mushrooms, that extends at least partially along the beds and is supported by:
a number of guides, along which the harvesting conveyor is movable;
wherein at least one of the guides is coupled to the shelving, and at least one of the guides is coupled to the picking platform and is movable together with the platform with at least the vertical directional component;
wherein at least a portion of the harvesting conveyor is:
mechanically connected to the at least one of the guides, and
descends at an angle with respect to a horizontal directional component along the shelving.

2. The system according to claim 1, wherein the harvesting conveyor belt is guided by at least two guides coupled to the picking platform, wherein the guides are in particular each spaced from the platform in a vertical direction between 75 cm and 125 cm, and in particular between 85 cm and 115 cm, more in particular each at the same distance from the platform as to form a parallel stretch to the picking platform at a picking height.

3. The system according to claim 1, wherein the guides comprise rollers and/or static guiders, wherein said static guiders are mounted on sides of the harvesting conveyor to guide the harvesting conveyor, leaving space for stipes to pass through unobstructed.

4. The system according to claim 1, wherein the harvesting conveyor is looped along at least a back and forward stretch that extend beyond the length of the bed, wherein the part beyond the bed comprises a lower running section, wherein at least one, but preferably both the forward and the backward stretch are at a distance of less than 50 cm, preferably less than 40 cm and more preferably less than 30 cm from a ground level, for providing a step passage.

5. The system according to claim 1, wherein the harvesting conveyor is at least partially frameless, in particular the part of the conveyor extending along the beds is frameless.

6. The system according to claim 1, wherein the harvesting conveyor is frameless.

7. The system according to claim 6, wherein the harvesting conveyor is hanging free between the guides, that is, without support.

8. The system according to claim 1, wherein the picking platform forms part of a picking lorry, wherein the picking platform horizontally extends below the harvesting conveyor, such that a projection of the harvesting conveyor on a plane wherein the picking platform extends, at least partly overlaps the picking platform.

9. The system according to claim 8 wherein the picking platform forms part of a picking lorry, wherein the picking lorry comprises a frame that is movably, attached to the shelving and wherein the picking platform is detachable from the frame or the shelving.

10. The system according to claim 1, wherein a moistening system is coupled to the picking platform, the moistening system comprising nozzles for spreading moisture over at least one support bed.

11. The system according to claim 1, wherein the harvesting conveyor is provided with a tensioner, located on the lorry or picking platform or at a distal location and comprising a movable guide or roller, that moves in order to compensate for the change in the total length of the trajectory of the harvesting conveyor when the picking platform is moved.

12. The system according to claim 11, wherein the tensioner comprises a plurality of independently removable weights.

13. The system according to claim 1, wherein the picking lorry comprises a frame comprising an arm that extends from the frame with a horizontal directional component, and wherein the arm supports a remote guide at a height level at or below the height of the lowest bed for the harvesting conveyor at a horizontal distance remote from the picking platform, such that a height of the harvesting conveyor decreases in the direction from said first guide attached to the picking platform to said remote guide supported by the arm.

14. The system according to claim 13, wherein the length of the arm is adjustable, in particular longitudinally compressible by a stopper, said stopper located near the end of the beds.

15. The system according to claim 13, wherein a section of the harvesting conveyor is at an angle with respect to the horizontal, wherein said section formed by said first guide and said second guide, wherein the angle is maintained below a maximum value of 45 degrees with the horizontal axis, but preferably below 40 degrees with the horizontal axis, wherein the measure of compression of the arm defines the angle.

16. The system according to claim 1, wherein a sweeper is attached to the picking platform and/or lorry, wherein said sweeper is adjacent to the picking platform and/or lorry, and extending in the direction of the bed, said sweeper covering the distance between the bed and the harvesting conveyor.

17. The system according to claim 1, wherein a catch tray is attached along the length of the picking platform and/or lorry at a side facing the beds, constructed of a compressible material, configured to intercept tumbling mushrooms.

18. The system according to claim 17, wherein said catch tray forms a guide for guiding the harvesting conveyor along the picking platform and/or lorry.

19. The system according to claim 1, wherein the shelvings are arranged in a cell, wherein the cell comprises a door, comprising a cut-out through which the harvesting conveyor extends.

* * * * *